(12) United States Patent
Maus et al.

(10) Patent No.: US 9,157,351 B2
(45) Date of Patent: Oct. 13, 2015

(54) METHOD FOR TREATING EXHAUST GAS CONTAINING SOOT PARTICLES

(71) Applicant: EMITEC GESELLSCHAFT FUER EMISSIONSTECHNOLOGIE MBH, Lohmar (DE)

(72) Inventors: Wolfgang Maus, Bergisch Gladbach (DE); Peter Hirth, Roesrath (DE); Rolf Brueck, Bergisch Gladbach (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 14/145,120

(22) Filed: Dec. 31, 2013

(65) Prior Publication Data
US 2014/0109555 A1 Apr. 24, 2014

Related U.S. Application Data

(60) Division of application No. 13/419,812, filed on Mar. 14, 2012, now Pat. No. 8,747,527, which is a continuation of application No. PCT/EP2010/062805, filed on Sep. 1, 2010.

(30) Foreign Application Priority Data

Sep. 14, 2009 (DE) .......................... 10 2009 041 090

(51) Int. Cl.
*F01N 3/00* (2006.01)
*F01N 3/01* (2006.01)
(Continued)

(52) U.S. Cl.
CPC .............. *F01N 3/01* (2013.01); *B01D 46/0032* (2013.01); *B03C 3/12* (2013.01); *B03C 3/383* (2013.01);
(Continued)

(58) Field of Classification Search
USPC .................. 60/274, 275, 276, 295, 297, 311; 422/186.03, 186.04; 96/55, 523, 524; 95/59, 63, 70, 79
See application file for complete search history.

(56) References Cited

U.S. PATENT DOCUMENTS 4,354,861 A   10/1982   Kalt
4,355,504 A * 10/1982   Liu et al. .......................... 60/275
(Continued)

FOREIGN PATENT DOCUMENTS

DE        10026696 A1    12/2001
DE     102005026032 A1    12/2006
(Continued)

*Primary Examiner* — Binh Q Tran
(74) *Attorney, Agent, or Firm* — Laurence A. Greenberg; Werner H. Stemer; Ralph E. Locher

(57) ABSTRACT

A method for converting soot particles of an exhaust gas includes providing at least nitrogen dioxide or oxygen in the exhaust gas, ionizing soot particles with an electric field, depositing electrically charged soot particles on inner channel walls of at least one surface precipitator, and bringing at least nitrogen dioxide or oxygen into contact with the deposited soot particles on the inner channel walls of the at least one surface precipitator. A device for carrying out the method includes at least one surface precipitator having a plurality of channels through which the exhaust gas can flow and extending between an inlet region and an outlet region, and at least one deposit inhibitor for electrically charged soot particles provided in at least part of the inlet region, especially allowing the soot particles to be evenly deposited and the surface precipitator to be continuously regenerated.

13 Claims, 4 Drawing Sheets

(51) Int. Cl.
  *B01D 46/00* (2006.01)
  *B03C 3/12* (2006.01)
  *B03C 3/38* (2006.01)
  *F01N 3/023* (2006.01)
  *F01N 3/10* (2006.01)
  *F01N 3/05* (2006.01)
  *F01N 13/00* (2010.01)

(52) U.S. Cl.
  CPC ............... *F01N 3/0231* (2013.01); *F01N 3/05* (2013.01); *F01N 3/106* (2013.01); *F01N 13/009* (2014.06); *B03C 2201/12* (2013.01); *B03C 2201/30* (2013.01); *F01N 2240/28* (2013.01)

(56) References Cited

U.S. PATENT DOCUMENTS

| | | | |
|---|---|---|---|
| 4,902,487 A | 2/1990 | Cooper et al. | |
| 5,466,279 A | 11/1995 | Hattori et al. | |
| 5,766,318 A | 6/1998 | Loreth et al. | |
| 5,993,521 A | 11/1999 | Loreth et al. | |
| 6,038,854 A * | 3/2000 | Penetrante et al. | 60/297 |
| 6,117,403 A | 9/2000 | Alix et al. | |
| 6,187,271 B1 | 2/2001 | Lee et al. | |
| 6,290,757 B1 | 9/2001 | Lawless | |
| 6,902,599 B2 | 6/2005 | Bardon | |
| 7,067,092 B2 * | 6/2006 | Hall et al. | 423/239.1 |
| 7,077,890 B2 | 7/2006 | Botvinnik | |
| 7,267,805 B2 | 9/2007 | Bruck et al. | |
| 7,514,047 B2 * | 4/2009 | Hirata et al. | 422/186.04 |
| 7,655,195 B1 | 2/2010 | Ichikawa et al. | |
| 7,758,675 B2 * | 7/2010 | Naito et al. | 96/61 |
| 2005/0039441 A1 | 2/2005 | Kakinohana et al. | |
| 2009/0007544 A1 | 1/2009 | Bruck | |
| 2009/0101016 A1 | 4/2009 | Fleck | |

FOREIGN PATENT DOCUMENTS

| | | |
|---|---|---|
| DE | 102005034033 A1 | 2/2007 |
| DE | 20122703 U1 | 3/2007 |
| DE | 60225902 T2 | 5/2009 |
| EP | 0341832 A2 | 11/1989 |
| EP | 1125704 A1 | 8/2001 |
| EP | 1508677 A1 | 2/2005 |
| JP | 04300661 A | 10/1992 |
| JP | 2005036712 A | 2/2005 |
| KR | 1020010080918 A | 8/2001 |
| KR | 100759146 A | 9/2007 |
| WO | 0115877 A1 | 3/2001 |
| WO | 0192692 A1 | 12/2001 |

* cited by examiner

METHOD FOR TREATING EXHAUST GAS CONTAINING SOOT PARTICLES

CROSS-REFERENCE TO RELATED APPLICATION

This is a divisional application of U.S. patent application Ser. No. 13/419,812, filed Mar. 14, 2012; which was a continuation application, under 35 U.S.C. §120, of International application PCT/EP2010/062805, filed Sep. 1, 2010; the application also claims the priority, under 35 U.S.C. §119, of German patent application No. DE 10 2009 041 090.2, filed Sep. 14, 2009; the prior applications are herewith incorporated by reference in their entirety.

BACKGROUND OF THE INVENTION

1. Field of the Invention

The present invention relates to a device for treating exhaust gas containing soot particles, in particular with a so-called electrostatic filter or electric filter, as well as a suitable method for converting soot particles of an exhaust gas. The invention is used, in particular, in the treatment of exhaust gases of mobile internal combustion engines in the field of automobiles, in particular in the treatment of exhaust gases resulting from diesel fuel.

A multiplicity of different concepts for eliminating soot particles from exhaust gases of mobile internal combustion engines have already been discussed. In addition to wall-flow filters which are alternately closed, open secondary flow filters and gravity precipitators, etc., systems have already been proposed in which the particles in the exhaust gas are charged electrically and then deposited by using electrostatic attraction forces. Those systems are known, in particular, by the term "electrostatic filter" or "electric filter."

Generally (a plurality of) discharge electrodes and collector electrodes, positioned in the exhaust line, are proposed for such electric filters. In that context, for example, a central discharge electrode which runs approximately centrally through the exhaust line and a surrounding lateral surface of the exhaust line as a collector electrode are used to form a capacitor. Through the use of that configuration of the discharge electrode and the collector electrode, an electrical field is formed transversely with respect to the direction of flow of the exhaust gas, wherein the discharge electrode can be operated, for example, with a high voltage which is in the range of approximately 15 kV. As a result, in particular corona discharges can be formed through which the particles which flow through the electrical field with the exhaust gas are charged in a unipolar fashion. As a result of that charging, the particles migrate to the collector electrode due to electrostatic Coulomb forces.

In addition to systems in which the exhaust line is embodied as a collector electrode, systems are also known in which the collector electrode is embodied, for example, as a wire mesh. In that context, the accumulation of particles on the wire mesh serves the purpose of combining the particles, where appropriate, with further particles in order to therefore form an agglomeration. The exhaust gas which flows through the mesh or grid then carries the relatively large particles along with it again and carries them to conventional filter systems.

Even if the systems described above have heretofore proven suitable for the treatment of soot particles, at least in trials, the implementation of that concept for series production in motor vehicles presents serious challenges. That applies, in particular, with respect to the greatly fluctuating, at times very heavy, soot load in the exhaust gas, as well as the desired retrofitability of such a system for currently existing exhaust systems. In addition, it is necessary to take into account the fact that the improved performance of such exhaust systems in terms of the elimination of soot particles also makes it necessary to perform (periodic or continuous) regeneration of the filter systems, involving the soot being converted into gaseous components.

With respect to the regeneration of filter systems, it is also known, in addition to the intermittent regeneration by brief heating, that is to say burning off of the soot (catalytically motivated oxidative conversion), to convert soot through the use of nitrogen dioxide ($NO_2$). The advantage of continuous regeneration with nitrogen dioxide is that the conversion of soot can already take place in that case at significantly lower temperatures (in particular lower than 250° C.). For that reason, continuous regeneration is preferred in many applications. However, that leads to the problem that it is necessary to ensure that the nitrogen dioxide in the stream of exhaust gas comes into contact to a sufficient degree with the deposited soot particles.

In that context, there are also technical difficulties in the implementation of continuous operation of such exhaust systems in motor vehicles, wherein the different loadings of the internal combustion engines lead to different streams of exhaust gas, compositions of exhaust gas and temperatures.

SUMMARY OF THE INVENTION

It is accordingly an object of the invention to provide a device and a method for treating exhaust gas containing soot particles, which overcome the hereinafore-mentioned disadvantages and at least partially solve the highlighted problems of the heretofore-known devices and methods of this general type. In particular, the intention is to describe a device for treating exhaust gas containing soot particles, which similarly makes a large precipitation effect available for soot particles and which can be satisfactorily regenerated. The intention is also to specify a corresponding method for converting soot particles of an exhaust gas. The device and the method are to be easily integrated into existing mobile exhaust systems and are to be equally capable of being manufactured cost-effectively.

With the foregoing and other objects in view there is provided, in accordance with the invention, a device for treating exhaust gas containing soot particles. The device comprises at least one source of nitrogen dioxide or oxygen, at least one ionization element for ionizing soot particles, at least one neutralization element for neutralizing electrically charged soot particles, at least one surface precipitator having an inlet region, an outlet region and a plurality of channels through which the exhaust gas can flow, the channels extending between the inlet region and the outlet region, and at least one deposition inhibitor disposed at least partially at the inlet region for inhibiting deposition of electrically charged soot particles.

The device proposed herein may, in particular, be part of an exhaust system of a motor vehicle which has a diesel engine. However, the device can also be made available as a modular kit for an exhaust system.

Accordingly, firstly a nitrogen dioxide source is provided. Such a nitrogen dioxide source is, for example, a catalytic converter which assists (together with other components of the exhaust gas, in particular oxygen) the conversion of nitrogen oxides (in particular nitrogen monoxide NO) contained in the exhaust gas into nitrogen dioxide. Basically, a plurality of such nitrogen dioxide sources may also be present, but this is not absolutely necessary. The nitrogen dioxide source can usually be implemented with a catalytic converter which has a honeycomb body with a coating, wherein the coating has platinum, rhodium, palladium or the like. The nitrogen dioxide source is therefore connected downstream of the internal combustion engine, and is therefore located at least partially in the exhaust system.

While the nitrogen dioxide source is usually preferably used in relatively "cold exhaust systems" (for example diesel engine applications), an oxidative conversion of the soot particles with oxygen from an oxygen source can also be carried out at relatively high temperatures (for example gasoline engine applications). For example, the internal combustion engine itself or a so-called secondary air input, that is to say, in particular, the feeding in of an oxygen-containing gas into the exhaust line, is preferably considered as an oxygen source. If appropriate, chemical conversion with a catalyst can also generate oxygen, so that this can also be considered as an oxygen source.

In particular, a device which alternatively has at least one nitrogen dioxide source or at least one oxygen source upstream of the surface precipitator in the exhaust line is preferred.

Furthermore, at least one ionization element for ionizing soot particles is provided. It is preferred in this case that the exhaust gas firstly reaches the nitrogen dioxide source before it reaches the section of the device with the at least one ionization element. The ionization element preferably includes an ionization electrode or a multiplicity of ionization electrodes. The at least one ionization element is connected to a voltage source, in particular to a high voltage source. It is also possible to regulate the voltage through the use of a control unit. Basically, a direct-current voltage source or an alternating-current voltage source can be made available.

Furthermore, at least one neutralization element for neutralizing electrically charged soot particles is provided. The at least one neutralization element carries out at least the task of feeding electrical charge to the electrically charged soot particles or discharging it therefrom (depending on the electrical charge), as a result of which, when contact occurs with the electrically charged soot particles, electrical neutralization or de-ionization of the soot particles takes place. The number of ionization elements and neutralization elements basically does not have to correspond, but it may be expedient that they do.

An electrical field is usually formed between the at least one ionization element and the at least one neutralization element. This electrical field extends, in particular, in the direction of the exhaust system and/or in the direction of flow of the exhaust gas, wherein the exhaust gas firstly reaches the at least one ionization element and later the at least one neutralization element. As a result, the at least one ionization element and the at least one neutralization element are offset with respect to one another in the direction of flow of the exhaust gas, in particular at a distance of several centimeters such as, for example, at least 5 cm, at least 15 cm or even at least 30 cm.

Furthermore, at least one surface precipitator is provided. The surface precipitator is distinguished by having a plurality of channels through which the exhaust gas flows, and by the channels extending between an inlet region and an outlet region. Basically, it would be possible to form a surface precipitator which only has two channels, but an embodiment in which a plurality of channels are provided, for example at least 30, at least 50 or even at least 100 channels, is preferred. The term "surface precipitator" is intended to express the fact that a surface which is very large (in particular also in relation to its volume) is made available for the accumulation of soot particles. In contrast to known variants, in which, where possible, the soot particles were agglomerated one on top of the other in a tightly limited space, the objective in this case is to distribute the soot particles over a large area over the surfaces of the channel walls which are formed by the channels. However, this does not rule out the possibility of the soot particles being deposited, for example, also in the interior of a porous channel wall. In particular, the external and internal surfaces of the channel walls can therefore in this case be considered to be surfaces which are suitable for the depositing of soot. A "channel" is understood herein to be, in particular, a delimited flow path having an extent which is clearly longer than its diameter, wherein the diameter is, in particular, significantly greater than the customary sizes of the soot particles. Even if it is sufficient for some purposes to form separate and discrete channels, communicating channels can nevertheless also be made available in which an exchange of partial streams of exhaust gas (for example through openings in the channel walls) is made possible. Providing channels with an extent of, for example, at least 5 cm, but preferably even at least 10 cm, which are, in particular, relatively small in cross section, readily permits the individual channels or surface precipitator to be configured in a way which is adapted to the flow profile.

However, in order to ensure that in fact there is no accumulation of soot particles in just one plane perpendicularly with respect to the direction of flow (as in the case of a grid or screen), at least one deposition inhibitor for electrically charged soot particles is provided at least partially at the inlet region. This inhibitor carries out the function of preventing deposition (exclusive or predominant) of the electrically charged soot particles in the inlet region. In this context, the deposition inhibitor can be configured in such a way that it is configured only for some of the channels or configured differently for the channels. The deposition inhibitor can, on one hand, relate to the surface precipitator itself, but it is also possible for the at least one deposition inhibitor to act on the stream of exhaust gas and therefore bring about a changed routing of the stream of exhaust gas through the surface precipitator. For this purpose, the at least one deposition inhibitor can be formed in a slightly offset fashion directly at the inlet region and/or starting from the inlet region in the direction of the outlet region. Under certain circumstances it is also possible for such a deposition inhibitor also to be provided for at least some of the channels from the inlet region to the outlet region. The configuration and/or distribution of the at least one deposition inhibitor for electrically charged soot particles in the surface inhibitor is to be selected in such a way that soot particles are deposited as uniformly as possible on the channel walls of the multiplicity of channels (and not only on the front face). This leads, in particular, to a situation in which the deposited soot particles are disposed over a large surface, that is to say at a relatively large distance from one another, even in the case of a briefly increased soot load of the exhaust gas. This provides, in a particular way, the possibility of regenerating the soot particles there continuously with nitrogen dioxide. This is promoted by the fact that the exhaust gas, which is conducted through the channels over a relatively long flow path and at a short distance from the channel wall, has the possibility of bringing about a conversion with small particles which are relatively free there. This results in a situation in which, in particular, an undesired drop of pressure over the surface inhibitors is avoided as the load with soot particles increases, since particularly effective continuous regeneration of the surface precipitator is carried out.

In accordance with another preferred feature of the invention, the at least one neutralization element is formed in the vicinity of the outlet region of the at least one surface precipitator. This is intended to mean, in particular, that the at least one neutralization element forms part of the outlet region, wherein it may be, in particular, part of the surface precipitator, may be positioned in (electrical) contact therewith or else may be disposed downstream thereof in the direction of flow. The at least one neutralization element can accordingly be accommodated in the surface precipitator, but a separate, downstream refinement of the at least one neutralization element is also possible. If the at least one neutralization element is an integral component of the surface precipitator, the surface precipitator simultaneously performs the function of neutralization, with the result that ultimately electrically neutral soot particles are deposited on the surfaces of the surface precipitator. If the at least one neutralization element can be formed downstream of the surface precipitator, the latter can be embodied in the manner of a conventional collector electrode in order to form the electrical field through the surface precipitator. The channels are then configured, in particular, in such a way that the electrically charged soot particles impinge on the channel wall due to the electrical forces.

It is preferred that the ionization element be disposed upstream of the surface precipitator in the direction of flow of the exhaust gas, as a result of which ionization of the soot particles occurs upstream of the surface precipitator. It is particularly preferred if the ionization element is disposed at a distance of at least 5 cm, in particular of at least 10 cm, upstream of the surface precipitator. The surface precipitator therefore does not serve to perform ionization but rather basically only as a collector for the soot particles which are already ionized (upstream).

In accordance with a further particularly preferred feature of the invention, the at least one surface precipitator is embodied as a honeycomb body. Such honeycomb bodies can basically be constructed with different materials, in particular also with metallic and/or ceramic components. The manufacturing methods for such honeycomb bodies have been known for many years and the honeycomb bodies have proven particularly suitable in terms of formation of contact between the stream of exhaust gas and the walls in the channels. In this case, the honeycomb body can have (only) open and/or (partially) closed channels. Basically, it is preferred that the channels extend substantially linearly and parallel to one another (such as, for example, in the case of an extruded honeycomb body), but this is not absolutely necessary. The channels and/or the channel walls can also be embodied with structures (grooves, knobs, sliding surfaces, etc.) in order to implement an additional improvement of the formation of contact between the retained soot particles and the nitrogen dioxide from the exhaust gas. As a result, the structure extends from the channel wall into the channels and, in particular, constricts the channel cross section. The channel walls may be impermeable and/or permeable to gas in this case, with it being possible to implement the latter by porosity of the material and/or by openings (for example holes).

In accordance with an added feature of the invention, various refinements of the at least one deposition inhibitor can be assigned to the channels. That is to say in other words, in particular, that during operation the at least one deposition inhibitor results in different deposition regions of the individual channels being influenced chronologically and/or spatially. Deposition inhibitors can therefore be embodied differently in the region of the centrally disposed channels than the deposition inhibitors in the channels in the edge region of the surface precipitator. Alternatively or cumulatively, it is possible to embody the deposition inhibitors near the inlet region differently than in the region of the outlet region for a number of channels. If the surface precipitator is itself a neutralization element, it is therefore possible to implement different electrical conductivity of the channel wall in particular in the profile direction of the channels and/or as a function of the position of the channels, as a result of which the embodiment of the electrical field and therefore the effect of the Coulomb's forces on the electrically charged soot particles is adapted.

In accordance with an additional feature of the invention, the at least one deposition inhibitor extends in various axial zones of the channels. Consequently, in some of the channels, a deposition inhibitor may be embodied from the inlet region to several millimeters into a channel, but it is also possible for the deposition inhibitor to extend as far as the outlet region. In this context, a plurality of deposition inhibitors (of the same type and/or different) can also be provided in the respective channels.

In accordance with yet another feature of the invention, the at least one deposition inhibitor is formed by various channel forms or shapes. In this specific embodiment of the surface precipitator, in particular if the latter constitutes a neutralization element, it should be made possible that the probability of impacting and/or the depositing capability and/or the flow paths for soot particles be adapted to the flow profile of the exhaust gas and/or the exhaust gas volume flow. This is intended, in particular. to counteract a situation in which different quantities of particles are made to flow into the channels. Instead, it is possible to implement a situation in which there are differing (and on average therefore uniform) flows into the channels given different streams of exhaust gas. The term "channel shape" therefore includes considering its cross section and the profile shape of the channel. Different channel shapes are provided, in particular, when the channels differ in one of the following properties: size (diameter) of the channel cross section, shape of the channel cross section, inclination of the channel profile, curvature of the channel profile, widening of the channel profile, constriction of the channel profile, position and/or type of the structures of the channel walls, etc.

In accordance with yet a further feature of the invention, channels in which there is a central flow are made at least larger or more structured than channels in which there is an off-center flow. This means, in other words, that relatively large channel cross sections and/or a smaller channel density is provided in the central region of the surface precipitator, and/or in the region thereof in which there is a central flow, than in the region of the surface precipitator which is off-center or near the edge. Alternatively or cumulatively to this, it is possible for the channel walls of the channels in which there is a central flow to be embodied to a relatively large degree with structures, that is to say with respect to the size of the structures, the frequency of the structures, etc. This measure takes into account, in particular, the fact that the pressure loss of the exhaust gas increases quadratically with the mass flow of exhaust gas as it flows through the surface precipitator. The provision of structures in the central region then leads to a situation in which overproportionally large parts of the stream of exhaust gas are also conducted into the edge regions for this part, with the result that in total approximately the same flow can be detected in the channels.

In accordance with yet an added feature of the invention, the at least one deposition inhibitor can be formed by at least one electrical insulator. In particular, ceramic coating is possible for this purpose. The coating can also be applied, for example, on metal surfaces. Alternatively, separate components which form an electrical insulator can also be added.

In accordance with yet an additional feature of the invention, it is basically also possible for the at least one surface precipitator to have, as a basic material, an electrical insulator which forms a deposition inhibitor, that is to say in other words, that the surface precipitator itself has at least partially no electrical conductivity. Then, in particular, by taking into account the channel shape (for example twisted and/or structured channels) or the concept of the surface precipitator (for example wall-flow filter with alternately closed channels) it is possible to ensure that the particles can be deposited on or in this basic material.

In accordance with again another feature of the invention, in order to also achieve the selective desposition of particles in a uniform fashion in this case over the entire surface of the surface precipitator, it is possible to integrate electrical conductivity, for example in such a way that the surface precipitator has at least one neutralization element, wherein the at least one neutralization element is embodied differently in the channels. Consequently, electrically conductive materials can be disposed in and/or on the basic material of the surface precipitator and are connected to an electrical ground. This can be achieved by correspondingly electrically conductive conductors, fibers, particles and the like (which are, if appropriate, in contact with one another). In particular, metal inlays are suitable for this purpose.

The surface precipitator preferably has porous channel walls which are formed in particular, with sintered material, ceramic, silicon carbide (SiC) or mixtures thereof. This is particularly preferably an (at least partially) extruded honeycomb body.

With the objects of the invention in view, there is also provided a method for converting soot particles of an exhaust gas. The method comprises:
 a) providing at least nitrogen dioxide or oxygen in the exhaust gas;
 b) ionizing soot particles with an electrical field;
 c) depositing electrically charged soot particles on inner channel walls of at least one surface precipitator; and
 d) placing at least nitrogen dioxide or oxygen in contact with the soot particles deposited on the inner channel walls of the at least one surface precipitator.

As a result, in particular continuous regeneration of soot particles is also specified with the device proposed according to the invention. For this reason it is also necessary to point out that the features which are presented with respect to the devices can be used to explain the method, and vice-versa. It is also necessary to note that the steps a) and b) can be carried out in succession and/or simultaneously, wherein emphasis is placed on the respective effect on a partial stream of exhaust gas. It is preferred that all of the steps a) to d) be carried out continuously during the operation of a mobile internal combustion engine. Furthermore it is preferred that step a) alternatively includes the provision/generation of nitrogen dioxide or oxygen within the exhaust line.

In accordance with another mode of the method of the invention, the flow behavior of the exhaust gas through the channels of the at least one surface precipitator or the configuration of the electrical field is varied as a function of an exhaust gas parameter. If appropriate, it is also possible to carry out both measures simultaneously or alongside one another. The flow behavior can be changed independently, for example by correspondingly configuring the surface precipitator with the result that there is a flow through different channels given differing flow behavior. However, it is also possible to perform active variation in that, for example, the frequency and/or field strength of the electrical field are regulated. In particular, the temperature, the mass flow, the volume flow and/or the flow speed of the exhaust gas are considered as exhaust gas parameters. Of course, other characteristic values of the operation of the internal combustion engine can also be used as an alternative thereto or additionally in order to draw conclusions about a corresponding exhaust gas parameter.

In accordance with a further mode of the invention, the method serves preferably to perform continuous regeneration of the at least one surface precipitator. For this purpose, the soot is placed in contact with nitrogen dioxide which has been generated upstream in the flow of exhaust gas, and is chemically converted. For a further explanation, recourse can be made to the so-called CRT method (CRT=Continuous Regeneration Trap) which is disclosed, for example, in European Patent Application EP 0 341 832, corresponding to U.S. Pat. No. 4,902,487.

In accordance with a concomitant mode of the invention, a method is also preferred in which the electrically charged soot particles are deposited uniformly on all of the channels of the at least one surface precipitator. This is to be understood, in particular, as meaning that the device and/or the surface precipitator is configured in such a way that the probability of deposition of the electrically charged soot particles on all of the inner channel faces of the surface precipitator is substantially the same. The measures which are to be taken, if appropriate, to achieve this have already been presented above.

The invention is preferably used in a motor vehicle having an internal combustion engine, in particular a diesel engine, with a downstream exhaust system which has a device according to the invention. For this purpose, the motor vehicle has, for example, a control unit for operating this device with the method according to the invention, wherein the control unit is configured, in particular through the use of corresponding software, to implement the operation according to the invention during the operation of the motor vehicle. If appropriate, the control unit can interact with sensors of the exhaust system and/or of the internal combustion engine and/or stored data models in order to adapt this system.

Other features which are considered as characteristic for the invention are set forth in the appended claims, noting that the features which are disclosed individually in the claims can be combined with one another in any desired technologically appropriate way and indicate further embodiments of the invention.

Although the invention is illustrated and described herein as embodied in a method for treating exhaust gas containing soot particles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
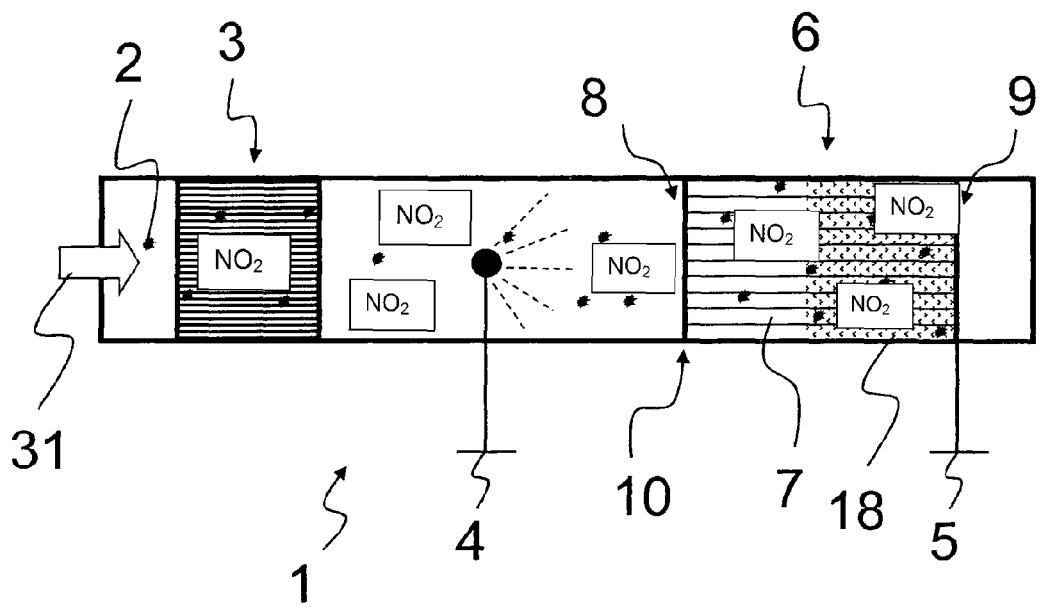
FIG. 1 is a diagrammatic, longitudinal-sectional view of a first embodiment variant of a device according to the invention.

Referring now to the figures of the drawings in detail and first, particularly, to FIG. 1 thereof, there is seen a first exemplary embodiment of a device 1 according to the invention. In this case, exhaust gas flows in a flow direction 31 through an exhaust system, which is illustrated herein in an approximately tubular shape, although that is not significant. The exhaust gas contains soot particles 2. The exhaust gas with the soot particles 2 is firstly conducted through a nitrogen dioxide source 3, in particular through a honeycomb-shaped catalytic converter with a platinum coating. This nitrogen dioxide source converts nitrogen monoxides (NO) contained in the exhaust gas into nitrogen dioxides ($NO_2$), as a result of which the proportion of nitrogen dioxides in the exhaust gas is increased (making up, in particular, at least 25% by weight or even at least 50% by weight of the entire nitrogen oxides). The exhaust gas which is prepared in this way flows on to an (individual) surface precipitator or collector 6. The surface precipitator 6 has an inlet region 8 and an outlet region 9. Linear channels 7, which extend parallel to one another, run between the inlet region 8 and the outlet region 9. The channels 7 are embodied in this case (partially) with a catalytic coating 18, but this is not absolutely necessary.

Before the exhaust gas reaches the surface precipitator 6, it enters an electrical field which is formed through the use of an ionization element 4 upstream of the surface precipitator 6 and a neutralization element 5 at the outlet region 9 of the surface precipitator 6. In the illustrated case, the neutralization element 5 is integrated into the channel walls of the surface precipitator 6. In order to prevent electrically charged soot particles from impacting directly on the front face of a honeycomb body in the vicinity of the inlet region 8, and so that the channels 7 themselves no longer serve for the accumulation of soot particles, a deposition inhibitor 10 is formed in the vicinity of the inlet region 8. This deposition inhibitor 10 actually reduces or prevents accumulation there. Different refinements of this deposition inhibitor 10 are also presented with reference to the following figures.

Figure 2:
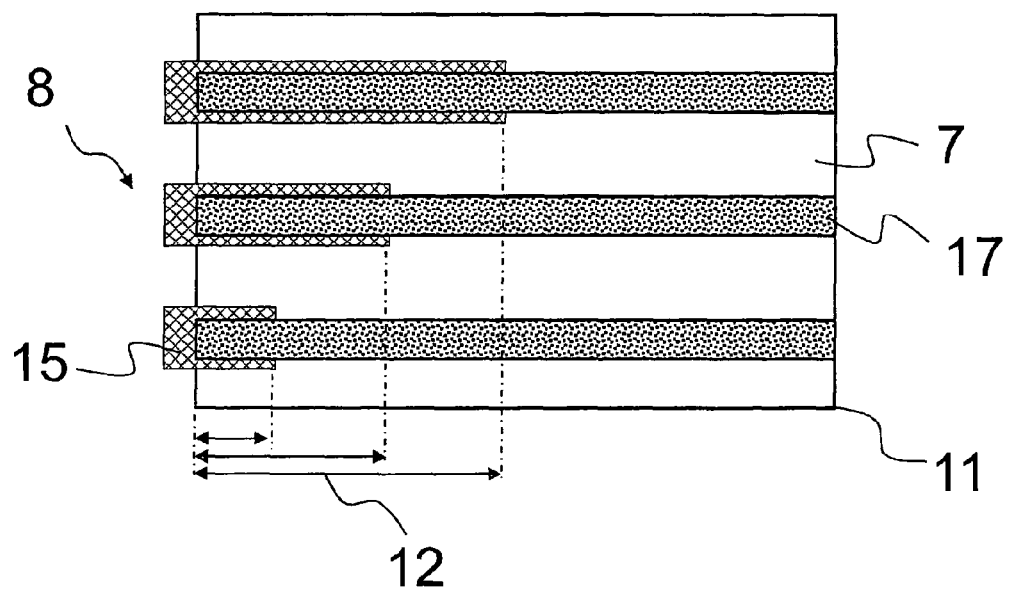
FIG. 2 is an enlarged, fragmentary, longitudinal-sectional view of a first embodiment variant of a surface precipitator.

FIG. 2 shows, for example, details of a surface precipitator having a multiplicity of channels 7 which are bounded by channel walls 17. As a result, in particular, a so-called honeycomb body 11 is formed. In order to prevent the soot particles from being deposited only in the inlet region 8 of the honeycomb body 11, an electrical insulator 15 (embodied in the manner of a coating on the channel walls) is provided there as a deposition inhibitor. This figure also indicates that the embodiment of the deposition inhibitor or, as shown herein, of the electrical insulator, can relate to different zones 12 of the channels 7. The zones 12 can therefore differ from one another, in particular in terms of their extent and/or position.

Figure 3:
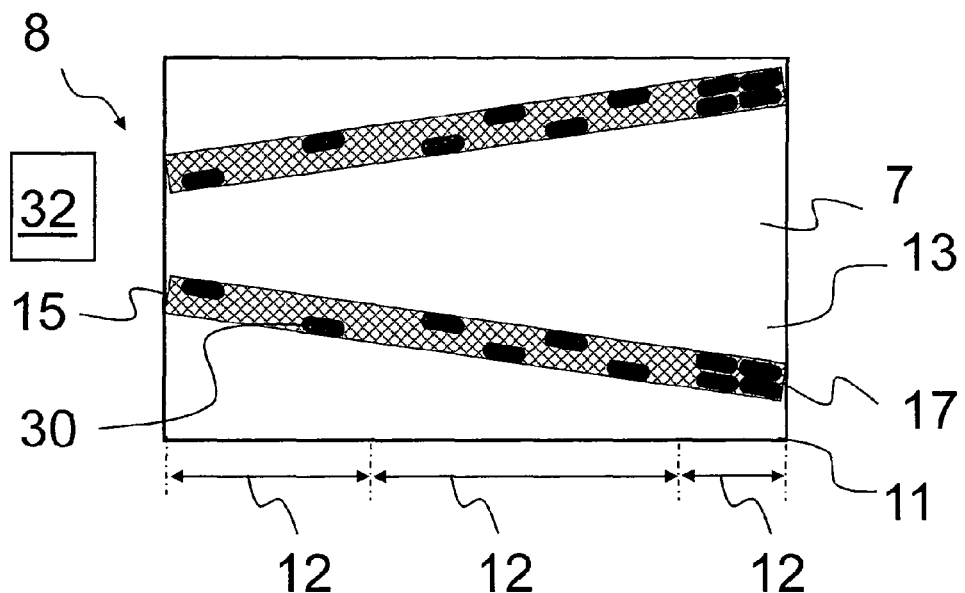
FIG. 3 is a fragmentary, longitudinal-sectional view of a second variant of a surface precipitator.

FIG. 3 shows an embodiment variant of a honeycomb body 11 which is formed with conically and/or tapering/widening channels 7. While the channel shape 13 in FIG. 2 is, for example, substantially round and is constant over its length, the cross section in the case of the conical channel shape changes in its longitudinal direction. Due to the changed channel cross sections, the flow can also be influenced in this case and/or deposition of soot particles can also be achieved in the rear part of the honeycomb body 11. An oxygen source 32 is also indicated in purely schematic form upstream of this honeycomb body 11. It is possible to integrate this oxygen source 32 into an exhaust system, for example instead of the nitrogen dioxide source.

Furthermore, a refinement of the honeycomb body 11 in which the channel walls 17 are embodied with a basic material which acts as an electrical insulator 15, for example ceramic or silicon carbide, is shown therein. However, in order to nevertheless motivate a movement of the soot particles to the channel walls 17 on the basis of Coulomb's forces, the channel walls 17 (which can, if appropriate, also be porous) have electrical conductors 30, for example in the manner of a reinforcement, embedded fibers, etc. The attraction force from the channel wall 17 to the soot particles therefore becomes stronger over the length of the channels 7, and/or this attraction force is smaller in the inlet region 8. This axially staggered conductivity can occur on a zone-by-zone basis in this case, with the result that in each case approximately the same conductivity is provided over predefined zones 12, but the transition can also be stepless or continuous.

Figure 4:
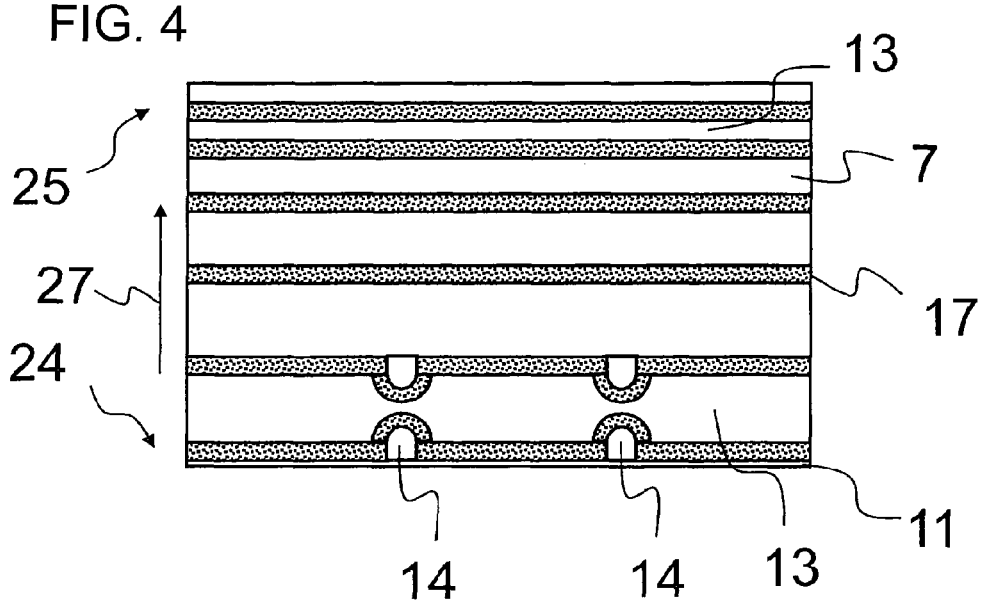
FIG. 4 is a fragmentary, longitudinal-sectional view of a third embodiment variant of a surface precipitator.

FIG. 4 illustrates further details of a honeycomb body 11 as a surface precipitator, wherein the channels 7 have different channel shapes 13. In a center 24, that is to say in a region of the surface precipitator 6 in which there is a central flow, the channel cross section 7 is relatively large. If the channel shape 13 is considered in the direction of a radius 27, it is to be noted that the cross section of the channels is smaller in the region of an edge 25, that is to say a region in which there is an off-center flow. In addition, it is noted that (only) the channels 7 in the region of the center 24 have structures 14. These structures build up a relatively large pressure drop, in particular as the flow speed of the exhaust gas increases or the volume flow of the exhaust gas becomes larger, as a result of which the exhaust gas is also conducted to a greater extent in radially outer channels. These measures contribute, in particular, to bringing about uniform loading with soot particles and uniform provision of nitrogen dioxide for the deposited soot particles.

Figure 5:
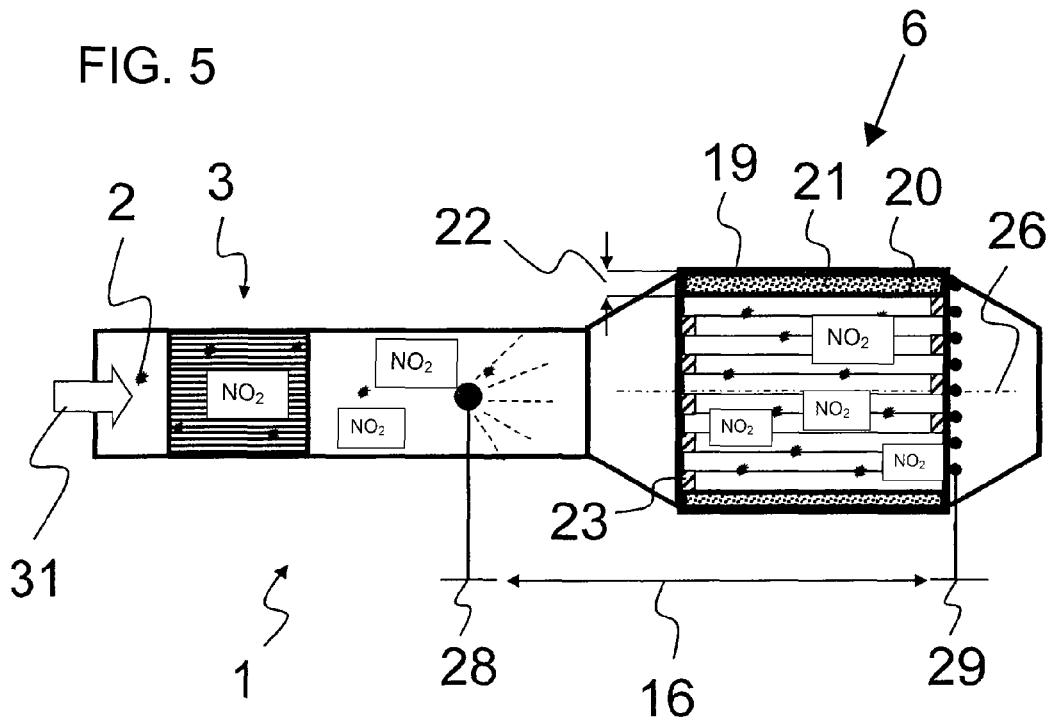
FIG. 5 is a longitudinal-sectional view of a further embodiment variant of the device.

FIG. 5 shows a further exemplary embodiment of the device 1 according to the invention. A left-hand partial region of the figure illustrates again how the exhaust gas containing soot particles 2 flows through the nitrogen dioxide source 3 in the flow direction 31, as a result of which more nitrogen dioxide is formed. In turn, an electrical field 16 is formed below, but this time through the use of an ionization electrode 28 which serves as an ionization element 4 and a ground electrode 29 which is disposed downstream of the surface precipitator 6 and serves as a neutralization element. Consequently, the surface precipitator 6 is completely located in the electrical field 16.

The surface precipitator 6 illustrated therein is, in particular, a conventional wall-flow filter made of ceramic or silicon carbide, the channels of which are alternately closed, as a result of which in each case flow dead ends are formed. However, the channels 7 do not, as illustrated therein, have to extend parallel to a central axis 26 of the honeycomb body. Alternately positioned stoppers or plugs 23, which are provided for the closure, can constitute a corresponding deposition inhibitor for electrically charged soot particles or be embodied as such. The channel walls are embodied in this case in a porous and/or gas-permeable fashion, with the result that the soot particles are filtered out. If electrical conductivity is present in such a surface precipitator 6, for example as a result of direct contact with the ground electrode 29 and with a corresponding configuration of the honeycomb body, a correspondingly selected conduction of the electrical charge should also take place. For this purpose, it is proposed that the honeycomb body be surrounded by a mat 21 which brings about a sufficient distance 22 from the housing 19 in order to avoid a voltage rollover from the surface precipitator 6 to the housing 19. If the honeycomb body is metallic and has its own casing 20, the same applies.

Figure 6:
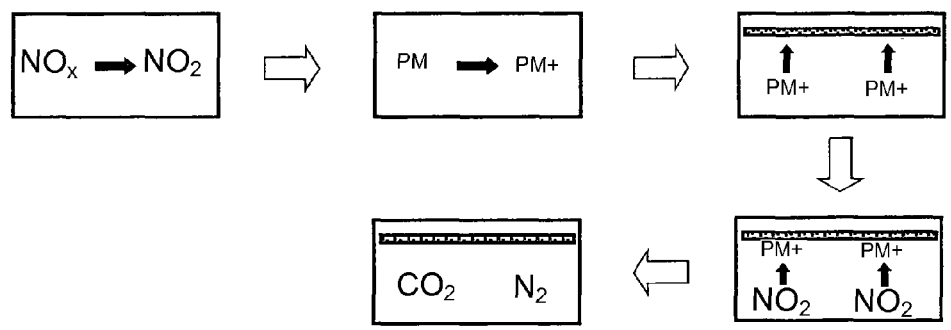
FIG. 6 is a diagram illustrating the method according to the invention.

FIG. 6 is an illustration of individual method steps. In this case, in a first step, nitrogen oxides ($NO_x$) and/or nitrogen monoxide (NO) is converted into nitrogen dioxide ($NO_2$) through the use of the nitrogen dioxide source (and/or a corresponding catalytic coating). Furthermore, the soot particles (PM) or some of the soot particles are ionized, as a result of which they have a purely electrical charge. The electrically charged soot particles ($PM^+$) are then deposited uniformly on a channel wall with the aid of corresponding electrostatic attraction forces, which takes place very uniformly where possible. The soot particles ($PM^+/PM$) which are spaced apart to a greater extent and are, if appropriate, still electrically charged or even already neutralized, are freely accessible to the generated nitrogen dioxide ($NO_2$), as a result of which simple and effective regeneration of the deposition surface and/or of the filter material is made possible. Catalysts can also be used in supportive fashion for this conversion process. After the conversion of the soot particles, the gaseous residues such as, for example, carbon dioxide ($CO_2$) and elementary nitrogen ($N_2$) are removed from the surface precipitator.

Figure 7:
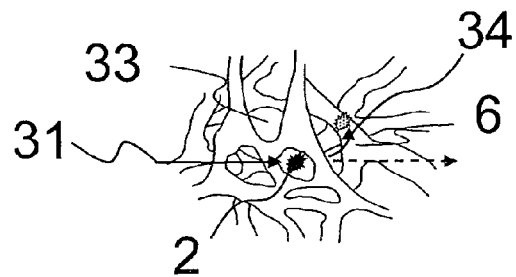
FIG. 7 is an illustration of attraction forces acting on a soot particle.

FIG. 7 is an exemplary and illustrative view of the effect of the surface precipitator 6 on the soot particle 2. The soot particle 2 accordingly flies, for example in the flow direction 31, through pores 33 of the surface precipitator 6, while being electrically charged in the process. Due to the potential toward the surface precipitator 6, this soot particle 2 does not fly linearly onward (as indicated by dashes) but instead experiences a deflection 34 and comes to bear on the surface precipitator 6. The soot particle 2 can then be correspondingly converted there.

Figure 8:
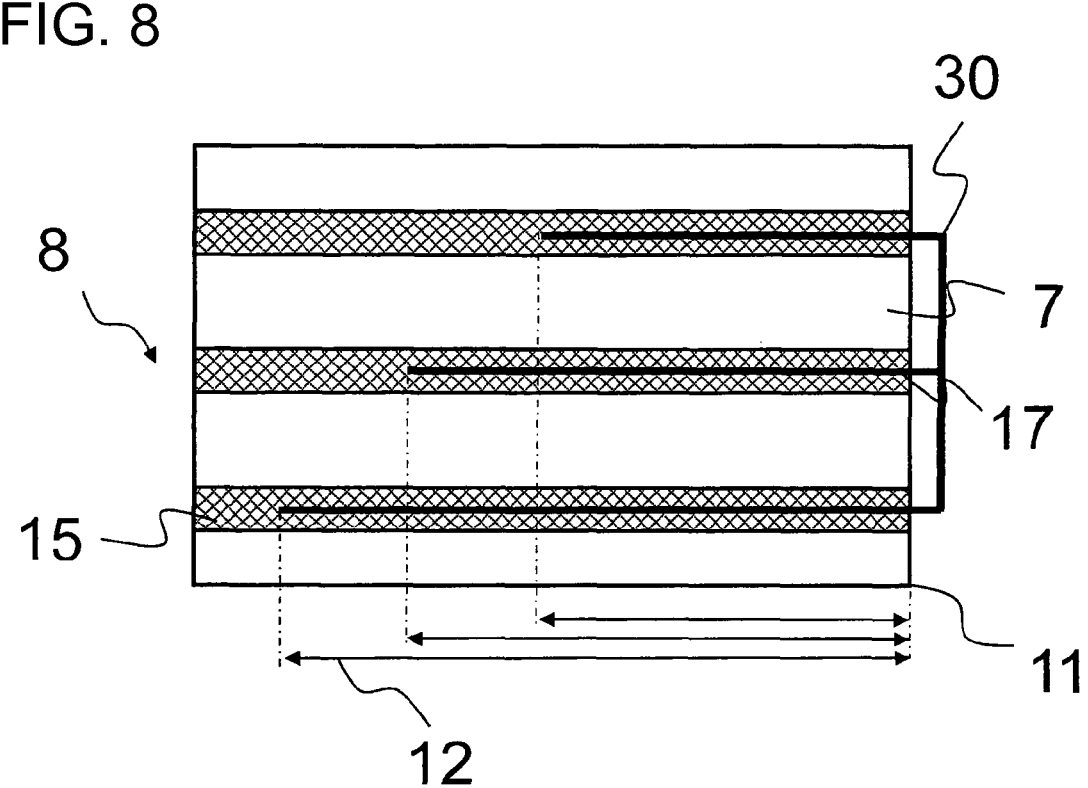
FIG. 8 is a longitudinal-sectional view of a further embodiment variant of a surface precipitator.

FIG. 8 shows details of a further embodiment variant of a surface precipitator according to the invention with a multiplicity of channels 7 which are bounded by channel walls 17. As a result, in particular, a so-called honeycomb body 11 is formed. The honeycomb body 11 is formed from an insulating material, preferably ceramic. In order to bring about a preferred deposition of soot particles in the honeycomb body 11, even downstream of the inlet region 8 of the honeycomb body 11, electrical conductors 30, which extend to different degrees in the direction of the inlet region 8 in different zones 12 of the honeycomb body, are provided in the honeycomb body which is embodied as an electrical insulator 15.

The invention provides, in particular, uniform deposition of the soot particles and continuous regeneration of the surface precipitator.

The invention claimed is:

1. A method for converting soot particles of an exhaust gas, the method comprising the following steps:
   providing a device for treating the soot particles having:
      at least one source of nitrogen dioxide or oxygen;
      at least one ionization element for ionizing soot particles;
      at least one surface precipitator having an inlet region, an outlet region and a plurality of channels through which the exhaust gas can flow, the channels extending between the inlet region and the outlet region; and
      at least one deposition inhibitor disposed at least partially at the inlet region for inhibiting deposition of electrically charged soot particles;
   a) providing at least nitrogen dioxide or oxygen in the exhaust gas by using the at least one source of nitrogen dioxide or oxygen;
   b) ionizing soot particles with an electrical field created by the at least one ionization element;
   c) depositing electrically charged soot particles on inner channel walls of the channels of the at least one surface precipitator and preventing a predominant deposition of electrically charged soot particles in the inlet region by using the at least one deposition inhibitor; and
   d) placing at least nitrogen dioxide or oxygen in contact with the soot particles deposited on the inner channel walls of the at least one surface precipitator.

2. The method according to claim 1, which further comprises carrying out steps a) and b) in succession.

3. The method according to claim 1, which further comprises carrying out steps a) and b) simultaneously.

4. The method according to claim 1, which further comprises carrying out steps a) to d) continuously during operation of a mobile internal combustion engine.

5. The method according to claim 1, which further comprises providing or generating nitrogen dioxide or oxygen within an exhaust line in step a).

6. The method according to claim 1, which further comprises varying a flow behavior of the exhaust gas through the channels of the at least one surface precipitator as a function of an exhaust gas parameter.

7. The method according to claim 1, which further comprises varying a configuration of the electrical field as a function of an exhaust gas parameter.

8. The method according to claim 7, which further comprises varying at least one of a frequency or a field strength of the electrical field.

9. The method according to claim 6, which further comprises using at least one of a temperature, a mass flow, a volume flow or a flow speed of the exhaust gas as the exhaust gas parameter.

10. The method according to claim 7, which further comprises using at least one of a temperature, a mass flow, a volume flow or a flow speed of the exhaust gas as the exhaust gas parameter.

11. The method according to claim 1, which further comprises continuously regenerating the at least one surface precipitator.

12. The method according to claim 1, which further comprises uniformly depositing the electrically charged soot particles on all of the channels of the at least one surface precipitator.

13. A method of converting soot particles of an exhaust gas in an exhaust system of a motor vehicle, the method comprising the following steps:
   a) providing at least nitrogen dioxide or oxygen in the exhaust gas by using at least one source of nitrogen dioxide or oxygen;
   b) ionizing soot particles with an electrical field created by at least one ionization element for ionizing soot particles;
   c) depositing electrically charged soot particles on inner channel walls of channels of at least one surface precipitator, and preventing a predominant deposition of electrically charged soot particles in an inlet region of the at least one surface precipitator by using at least one deposition inhibitor disposed at least partially at the inlet region; and
d) placing at least nitrogen dioxide or oxygen in contact with the soot particles deposited on the inner channel walls of the at least one surface precipitator.

\* \* \* \* \*